United States Patent [19]
Bessey

[11] Patent Number: 5,391,115
[45] Date of Patent: Feb. 21, 1995

[54] LOW GRAVITY JUMPING APPARATUS

[76] Inventor: Vance Bessey, 2 Adams Ct., Bath, Me. 04530

[21] Appl. No.: 66,891

[22] Filed: May 25, 1993

[51] Int. Cl.⁶ .............................................. A63H 27/10
[52] U.S. Cl. ..................................... 472/80; 472/133; 472/50; 472/134; 446/225
[58] Field of Search ................. 472/50, 131, 134, 137, 472/133, 135, 80, 49; 446/225

[56] References Cited

U.S. PATENT DOCUMENTS

| | | | |
|---|---|---|---|
| 247,135 | 9/1881 | Turner | 472/80 |
| 903,211 | 11/1908 | Marrder | 472/131 |
| 1,305,592 | 6/1919 | Fernandez | 472/50 |
| 2,311,171 | 2/1943 | Hawthorne | 472/49 |
| 3,701,528 | 10/1972 | Ryan | 472/131 |
| 4,758,199 | 7/1988 | Tillotson | 446/225 |
| 4,784,628 | 11/1988 | McArdle | 446/225 |
| 4,884,987 | 12/1989 | Mason | 446/225 X |
| 5,267,906 | 12/1993 | Kitchen | 472/131 X |

Primary Examiner—Carl D. Friedman
Assistant Examiner—Beth A. Aubrey
Attorney, Agent, or Firm—William B. Ritchie

[57] ABSTRACT

An apparatus for simulating a lower gravity environment. The invention allows individuals to experience a simulated reduction in the gravity of Earth. A large balloon provides a buoyant upward force. The balloon is attached to a sturdy frame which is secured to a harness for anchoring the individual to the apparatus. The frame is attached to the balloon with a rotating hinge, allowing for horizontal rotation of the individual. The frame may also attach to the harness with a rotating hinge allowing for vertical rotation of the individual.

12 Claims, 3 Drawing Sheets

LOW GRAVITY JUMPING APPARATUS

BACKGROUND OF THE INVENTION

1. Field of the Invention

The invention relates to apparatus for simulating low gravity situations.

2. Description of the Related Art

If the force of gravity acting upon an individual is lessened, the individual will experience feelings of weightlessness and an amplification of physical strength and agility.

Prior art has attempted to achieve this result in a variety of ways. U.S. Pat. No. 3,701,528 provides a means for simulating reduced gravitational forces with a cable and pulley system. The individual falls from the system which is attached to a cable. The system acts to limit the acceleration of the individual as they fall toward the ground. This limitation in acceleration works to simulate a reduction in the natural gravitational pull.

U.S. Pat. No. 4,402,500 works to simulate weightlessness with a combination of spinning and rotating within an apparatus. In this case the individual is positioned inside the apparatus which then rotates, causing the individual to feel weightless.

Nothing in the prior art provides for an apparatus which achieves the goal of simulated reduced gravitational pull by applying upward force applied against the downward gravitational pull, allowing an individual on the ground to accomplish greater feats of athletic agility.

SUMMARY OF THE INVENTION

It is an object of the invention to provide an apparatus for simulation of reduced gravitational pull.

It is another object of the invention to provide an apparatus which allows amplification of physical strength and agility.

It is still another object of the invention to provide an apparatus for simulation of reduced gravitational pull which allows the user to remain mobile along both the horizontal and vertical axis.

It is still another object of the invention to provide an apparatus for simulation of reduced gravitational pull which is durable enough to withstand continuous use.

It is still another object of the invention to provide an apparatus for simulation of reduced gravitational pull which is inexpensive to produce.

The invention is a low gravitational jumping apparatus for an individual. Means for lifting said apparatus with a buoyant upward force is provided. A harness for securement of said individual, and a frame are provided. Means for securing said frame to said harness, and means for securing said frame to said lifting means are provided.

DETAILED DESCRIPTION OF THE INVENTION

The weight of an individual is determined by their individual mass times the force of gravity. If either the individual's mass or the force of gravity is reduced, that individuals relative weight will also lessen. As gravity is a force acting in a downward vector, a force acting in an upward vector would act to decrease the effective force of gravity on an element in the same plane. This invention serves to place individuals in an apparatus with a flotation device that acts against the force of gravity. This allows the individual to experience a feeling of reduced weight, thus, providing an opportunity for increased agility and athletic ability.

Figure 1:
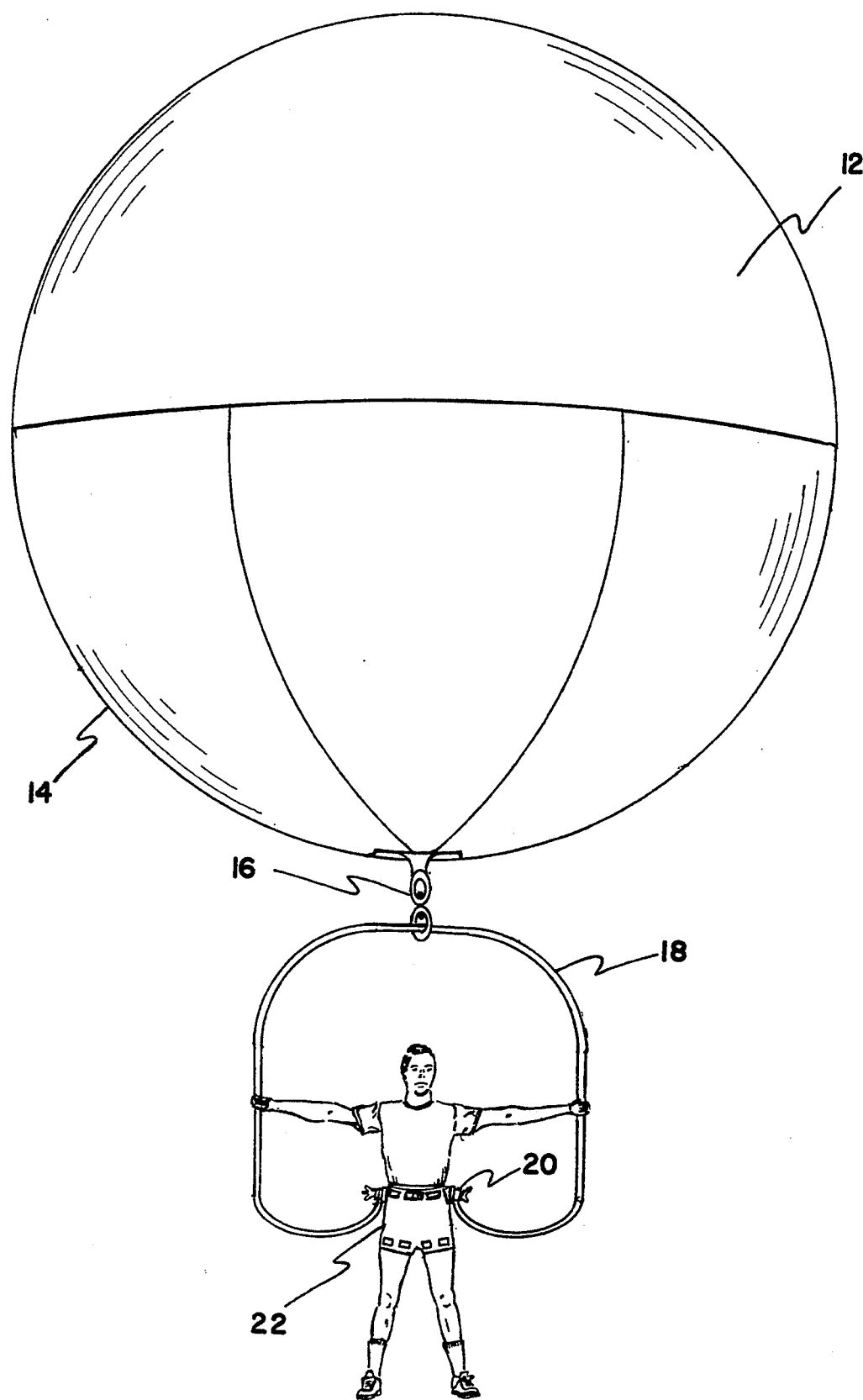
FIG. 1 is a front view of the apparatus as it appears when attached to the user.

FIG. 1 is a front view of the apparatus as it appears when attached to the user. Balloon 12 is preferably a twenty-five foot diameter latex rubber balloon filled to capacity with helium to provide a lift. An alternative to the single balloon would be multiple smaller balloons. For a child or a small adult, a single smaller balloon could also be employed. Balloon 12 allows for a buoyant upward force. Balloon 12 may be covered with an envelope 14. Envelope 14 is preferably composed of nylon or other durable fabric. Envelope 14 acts to protect balloon 12 from elements which could act to injure the integrity of balloon 12. Envelope 14 also serves to provide a surface for lights or banners. Balloon 12 is attached to one eye of eye & eye swivel 16. Rotating swivel 16 is capable of 360' free movement in the horizontal plane. Swivel 16 is constructed of a durable material, preferably steel.

The midsection of frame 18 rests on the other eye of swivel 16. Frame 18 is preferably cardioid-like shaped. Frame 18 may also be U shaped. Frame 18 is constructed of a lightweight durable material, preferably $\frac{5}{8}''$ diameter solid aluminum.

The user of the apparatus will be secured into harness 22. To use the apparatus, the user pushes off the ground. The apparatus allows the user to have a lighter weight, much the same as they would possess in a lower gravitational environment such as the moon.

Figure 2:
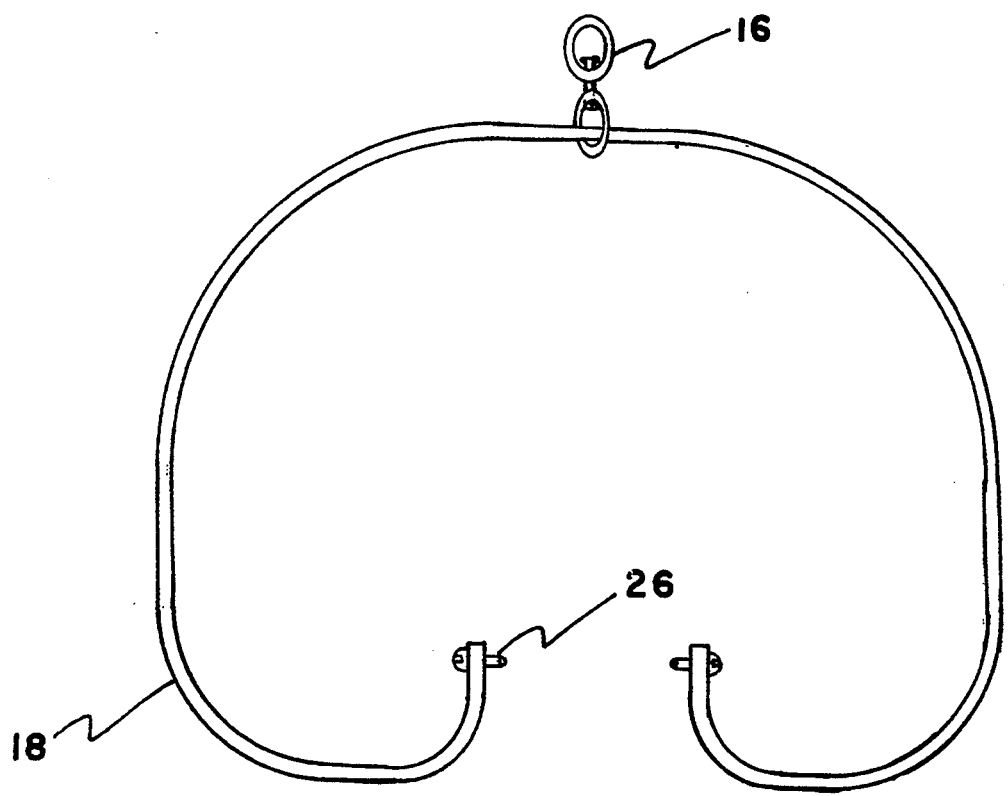
FIG. 2 is a front view of the frame of the apparatus.

As shown in FIG. 2, each end of frame 18 is equipped with a coupling 26 with a rotating hinge 20. Swivel 16 is shown at attached to frame 18 and is free to slide along frame 18.

Rotating hinges 20 allow the user to rotate vertically and swivel 16 allows the user to rotate horizontally.

The cardioid-like shape of frame 18 allows the user to rotate freely with bent knees on the vertical axis without risk of collision with frame 18. Frame 18 is preferably 5 feet in length.

Figure 3:
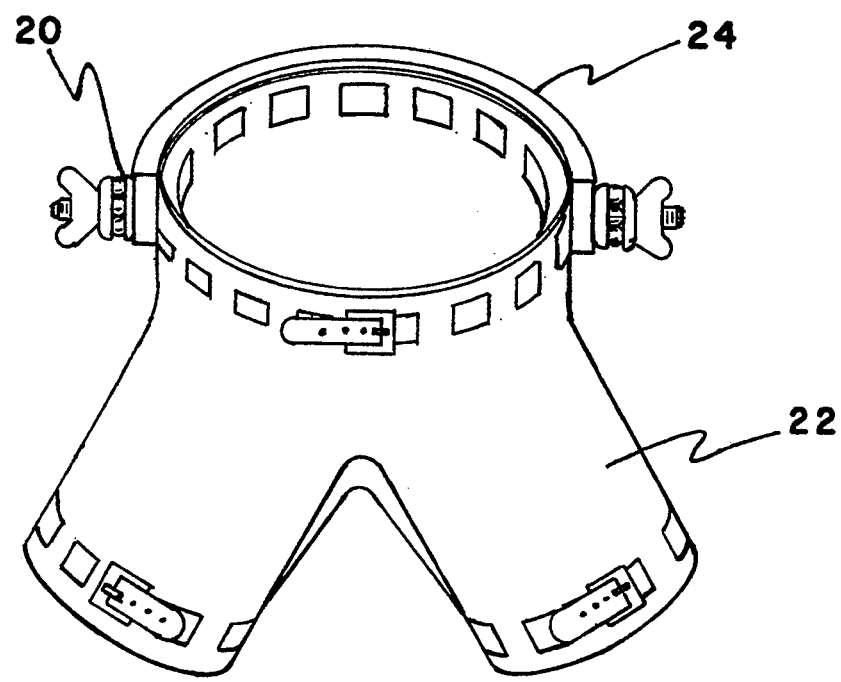
FIG. 3 is a front view of the harness of the apparatus.

FIG. 3 is a front view of harness 22 of the apparatus. Harness 22 allows the user to slide each leg through harness 22 which then secures to the user at the waist. Harness 22 is comprised of a durable material, such as leather, which will not tear when used. The pant-like harness 22 is used to attach the user to the invention. Harness 22 is dimensioned to fit a range of sizes.

Harness 22 is secured to the apparatus via coupling 26. A reinforcement bar 24 may be used to secure harness 22 to coupling 26 for added support.

Figure 4:
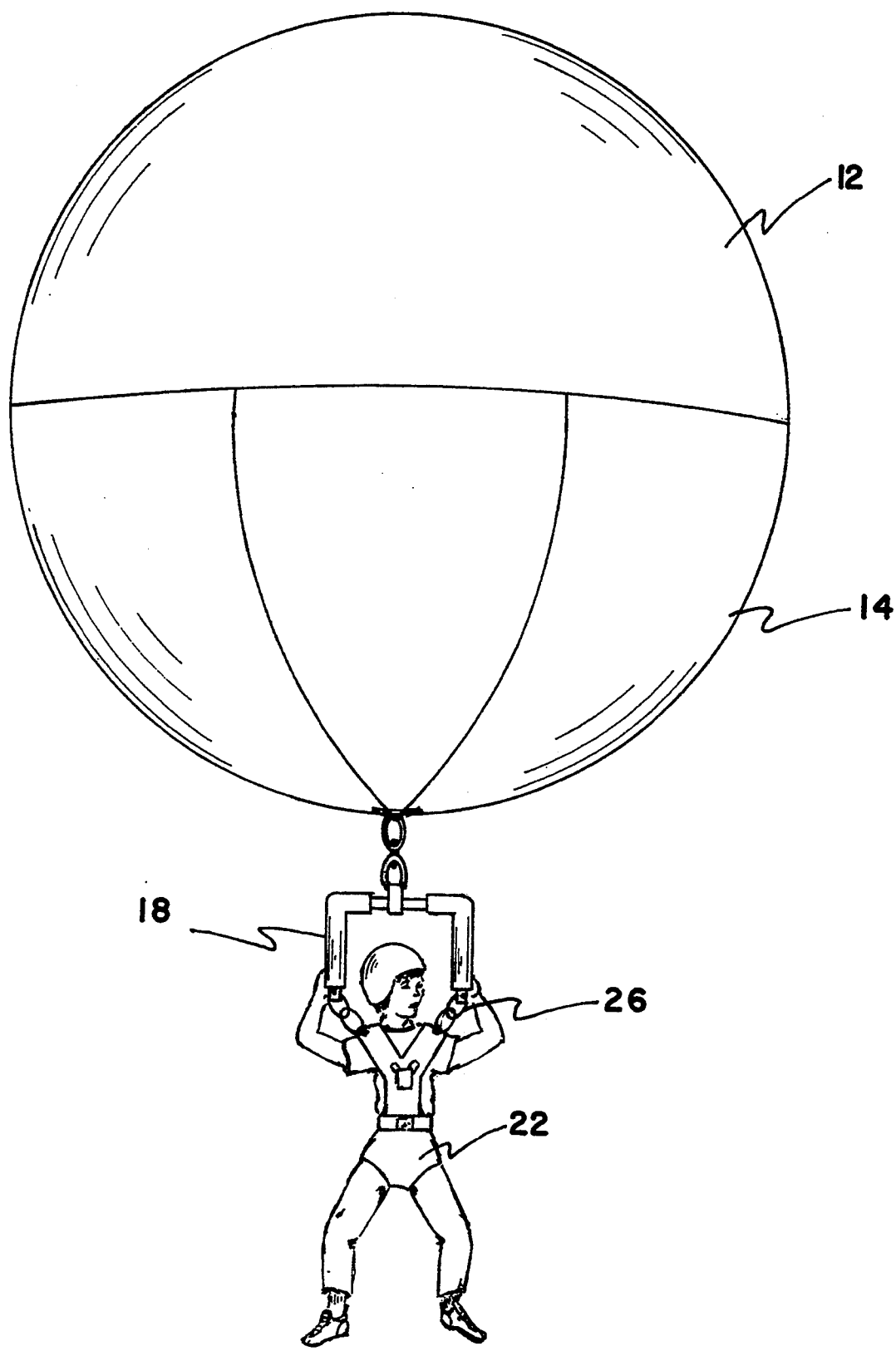
FIG. 4 is a front view of an alternative embodiment of the apparatus.

FIG. 4 is a front view of an alternative embodiment of the apparatus. In this embodiment, harness 22 attaches through the waist, legs and over the shoulders of the user. Couplings 26 are attached to shoulder area of harness 18. This embodiment will not allow rotation of the individual in a vertical direction, but will still permit horizontal rotation.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A low gravitational jumping apparatus for an individual comprising:
   a balloon with a buoyant upward force that is a predetermined percentage of the weight of said individual;
   a harness for securement of said individual;
   a frame;
   means for securing said frame to said harness:
   means for securing said frame to said balloon;
   means for permitting said individual to simultaneously move in a vertical, horizontal and rotational manner wherein the range of motion is substantial greater than said individual would be able to accomplish without the apparatus.

2. The apparatus in claim 1, wherein said securing means for said frame to said harness is a coupling.

3. The apparatus in claim 2, wherein said coupling has rotating hinges.

4. The apparatus in claim 3, wherein said securing means for said frame to said balloon is a rotating hinge.

5. The apparatus in claim 4, wherein said frame is cardioid-like shaped.

6. The apparatus in claim 5, wherein said harness is secured through the legs and the waist.

7. The apparatus in claim 6, wherein said harness has a reinforcement bar.

8. The apparatus in claim 5, wherein said harness is secured through the legs, the waist and around the shoulders.

9. The apparatus in claim 4, wherein said frame is U shaped.

10. The apparatus in claim 9, wherein said harness is secured through the legs and the waist.

11. The apparatus in claim 10, wherein said harness has a reinforcement bar.

12. The apparatus in claim 9, wherein said harness is secured through the legs, the waist and around the shoulders.

* * * * *